(12) United States Patent
Yamada et al.

(10) Patent No.: US 6,389,650 B1
(45) Date of Patent: May 21, 2002

(54) HOSE CLIP

(75) Inventors: Satoshi Yamada; Masahiro Aihara, both of Yokohama (JP)

(73) Assignee: Piolax, Inc., Kanagawa-ku (JP)

( * ) Notice: Subject to any disclaimer, the term of this patent is extended or adjusted under 35 U.S.C. 154(b) by 0 days.

(21) Appl. No.: 09/548,487

(22) Filed: Apr. 13, 2000

(30) Foreign Application Priority Data

Apr. 15, 1999 (JP) .......................... P11-108304

(51) Int. Cl.[7] .................. F16L 33/02; B65D 63/00
(52) U.S. Cl. .................. 24/20 R; 24/20 CW
(58) Field of Search .................. 24/20 CW, 20 EE, 24/20 R, 22, 22 EE, 23 R

(56) References Cited

U.S. PATENT DOCUMENTS

| | | | |
|---|---|---|---|
| 4,996,749 A | * | 3/1991 | Takahashi .................. 24/20 R |
| 5,189,507 A | * | 2/1993 | Kawashima et al. .......... 24/20 R |
| 5,596,790 A | * | 1/1997 | Möller .................... 24/20 EE |
| 5,706,557 A | * | 1/1998 | Beicht .................... 24/20 R |
| 5,715,579 A | * | 2/1998 | Beicht et al. ............... 24/20 R |
| 5,864,926 A | * | 2/1999 | Gyöngyösi et al. ......... 24/20 R |

FOREIGN PATENT DOCUMENTS

JP 534386 7/1993

* cited by examiner

*Primary Examiner*—Anthony Knight
*Assistant Examiner*—Ruth C. Rodriguez
(74) *Attorney, Agent, or Firm*—Howard & Howard

(57) ABSTRACT

A hose clip of the present invention comprises a leaf spring main body formed by curving a resilient member into an annular shape, a slot hole provided to one end portion of the leaf spring main body, a first lug portion provided to the one end portion of the leaf spring main body on a tip end side from the slot hole and projecting outward, an inserted chip provided to the other end portion of the leaf spring main body to be inserted into the slot hole, a projecting portion provided to the inserted chip and projecting outward as to the leaf spring main body, an engaged portion provided to the one end portion of the leaf spring main body on a tip end side from the slot hole to be engaged with the projecting portion, a second lug portion provided to the inserted chip on a tip end side from the projecting portion and projecting outward, a sloped face provided between the projecting portion and the second lug portion on the inserted chip and projecting outward to a larger degree as the sloped face approaches the second lug portion, and a sliding portion provided to the one end portion of the leaf spring main body on a tip end side from the slot hole for sliding on the sloped face.

12 Claims, 8 Drawing Sheets

HOSE CLIP

BACKGROUND OF THE INVENTION

The present invention relates to a hose clip and particularly to a hose clip that can be used suitably for connecting inner pipes or the like of an automobile by using a hose.

Conventionally, in connecting metal pipes by using a plastic hose, respective end portions of the hose are fitted over outer peripheries of the metal pipes and then outer peripheries of the end portions of the hose fitted over the outer peripheries of the metal pipes are respectively fastened by using hose clips to fix the hose to both the metal pipes.

Japanese Utility Model Application Laid-open publication No. 5-34386 discloses a hose clip as shown in FIG. 13.

In FIG. 13, the hose clip HC has a leaf spring main body 1 having resiliency and curved into an annular shape.

At an end portion of the leaf spring main body 1, a slot hole 2 and a first lug chip 3 projecting outward on a tip end side from the slot hole are formed. On the other hand, at the other end portion of the leaf spring main body 1, an inserted chip 4 inserted into the slot hole 2 and a second lug chip 5 projecting outward at a tip end portion of the inserted chip 4 are formed.

The inserted chip 4 on the other end portion of the leaf spring main body 1 is formed with a locking chip 6 and a receiving chip 7 with which the locking chip 6 can engage is formed at a lower portion of the first lug chip 3 at the one end portion of the leaf spring main body 1. A tool insertion window 8 through which a tool is inserted is formed outside of the receiving chip 7.

This hose clip HC is brought into a temporarily locked state when the first lug chip 3 and the second lug chip 5 are pinched and opened by using a pair of pliers or the like and the locking pawl 6 engages with the receiving chip 7. In this state, the clip is positioned at the outer periphery of the hose (not shown) and the tool is inserted from the tool insertion window 8 to apply leverage, thereby moving the first lug chip 3 radially outward and the second lug chip 5 radially inward with respect to each other. As a result, engagement of the locking chip 6 and the receiving chip 7 with each other is cancelled to reduce a diameter of the leaf spring main body 1 by resilient force of the main body 1.

SUMMARY OF THE INVENTION

However, in the above hose clip HC, when the engaged state of the locking chip 6 and the receiving chip 7 in the temporarily locked state is cancelled, the diameter of the leaf spring main body 1 is reduced instantaneously to fasten the hose. Therefore, in some cases, the hose clip HC moves violently such that positions of the hose clip HC and the hose relative to each other are displaced from those set in advance and that an expected mounted state may not be achieved.

It is an object of the present invention to provide a hose clip for arbitrarily controlling a diameter-reducing step by maintaining a tool in contact with the hose clip in the diameter-reducing step when the temporarily locked state is cancelled.

According to the invention, there is provided a hose clip comprising a leaf spring main body formed by curving a resilient member into an annular shape, a slot hole provided to one end portion of the leaf spring main body, a first lug portion provided to the one end portion of the leaf spring main body on a tip end side from the slot hole and projecting outward as to the leaf spring main body, an inserted chip provided to the other end portion of the leaf spring main body to be inserted into the slot hole, a projecting portion provided to the inserted chip and projecting outward as to the leaf spring main body, an engaged portion provided to the one end portion of the leaf spring main body on a tip end side from the slot hole to be engaged with the projecting portion, a second lug portion provided to the inserted chip on a tip end side from the projecting portion and projecting outward as to the leaf spring main body, a sloped face provided between the projecting portion and the second lug portion on the inserted chip and projecting outward to a larger degree from the leaf spring main body as the sloped face approaches the second lug portion, and a sliding portion provided to the one end portion of the leaf spring main body on a tip end side from the slot hole for sliding on the sloped face. Here, a temporarily locked state in which the projecting portion engages with the engaged portion is obtained when a gap between the first lug chip and the second lug chip is reduced to open the leaf spring main body until the sliding portion climbs over the projecting portion and the sliding portion slides on the sloped face when the gap between the first lug chip and the second lug chip is further reduced after the temporarily locked state.

DETAILED DESCRIPTION OF THE PREFERRED EMBODIMENTS

Figure 1:
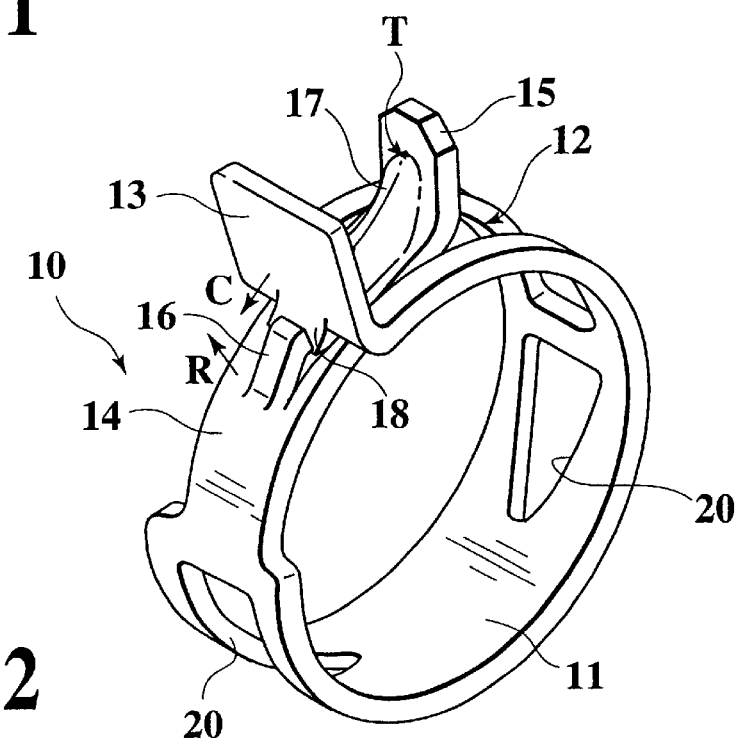
FIG. 1 is a perspective view showing a temporarily locked state of a hose clip according to a first embodiment of the present invention.
Figure 2:
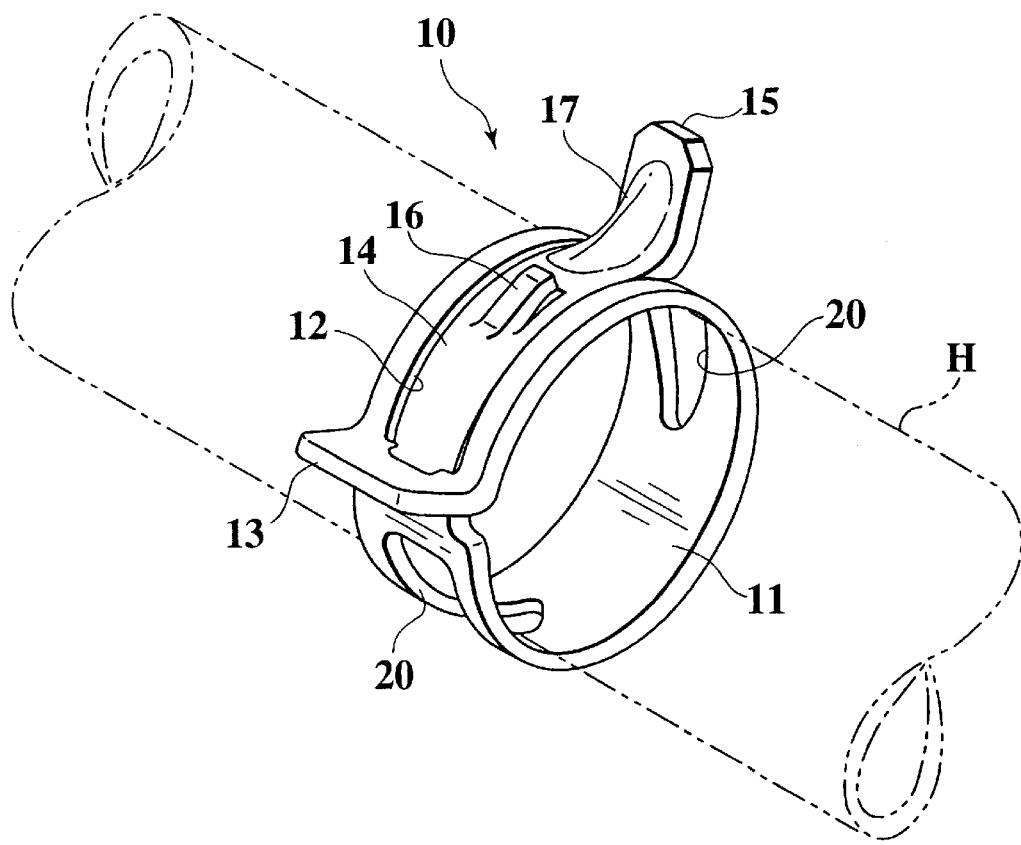
FIG. 2 is a perspective view showing the hose clip with a reduced diameter according to the first embodiment.
Figure 3:
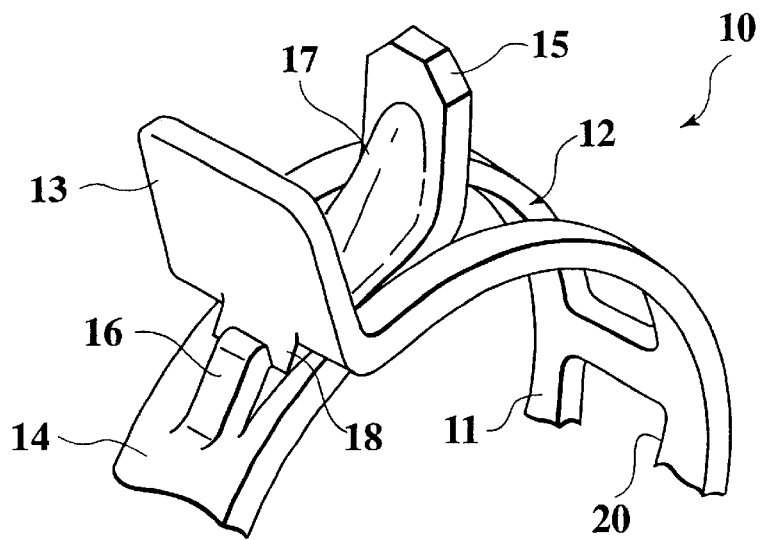
FIG. 3 is a partial enlarged perspective view showing the temporarily locked state according to the first embodiment.
Figure 4A:
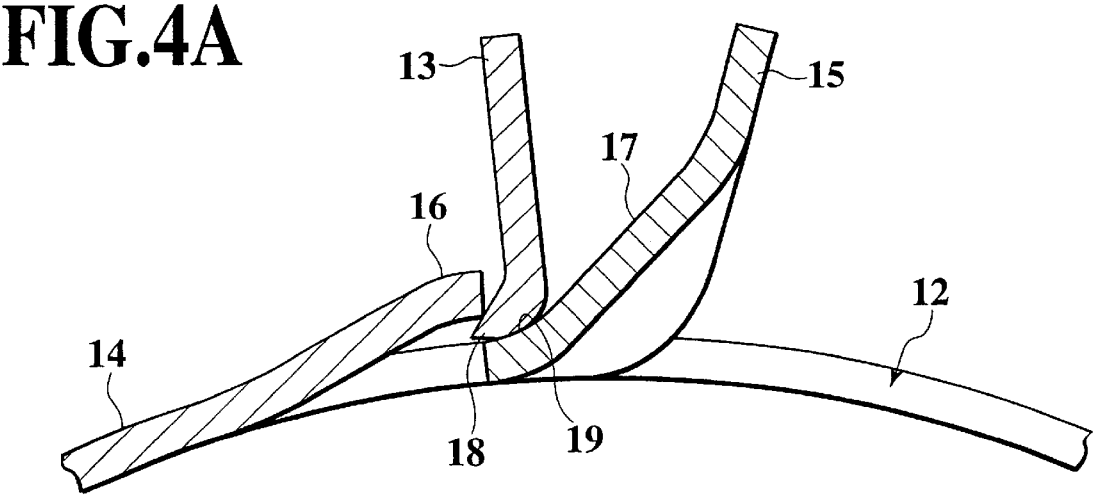
FIG. 4A is a partial enlarged sectional view showing the temporarily locked state according to the first embodiment.
Figure 4B:
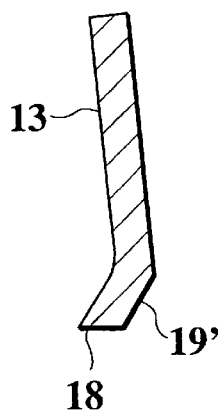
FIG. 4B shows a structure of a sliding portion formed with a chamfered portion.

Respective embodiments of a hose clip of the invention will be described below in detail by proper reference to the drawings.

First, the first embodiment of the invention will be described in detail by reference to FIGS. 1 to 7B.

As shown in FIGS. 1 to 4, a hose clip 10 has a leaf spring main body 11 formed by curving a metal plate having a band shape and resilient quality into an annular shape and effecting spring force in a direction where a diameter of the leaf spring main body 11 reduces. At one end portion of the leaf spring main body 11, a slot hole 12 and a first lug chip 13 projecting outward at a tip end side from the slot hole 12 are formed.

At the other end portion of the leaf spring main body 11, an inserted chip 14 to be inserted through the slot hole 12 and a second lug chip 15 formed by bending a tip end side from the inserted chip 14 to project outward in a diameter direction of the hose clip 10 at the tip end of the inserted chip are formed.

Furthermore, to the inserted chip 14, a locking pawl 16 that is a projecting portion formed by cutting and raising outward in a diameter direction of the hose clip 10 (direction R in FIG. 1) and a sloped face 17 on a second lug chip 15 side with respect to the locking pawl 16 and projecting outward in the radial direction of the hose clip 10 as it approaches the second lug chip 15 are provided. In a case of the present embodiment, the sloped face 17 has a projecting shape formed by processing a bent portion of the second lug chip 15 into a bead shape.

In the case of the present embodiment, the sloped face 17 has a top portion (ie, a point T positioned outside in the radial direction of the hose clip 10 in the top portion) higher than the locking pawl 16 and a lower edge portion disposed to be substantially adjacent to the locking pawl 16. A height and a position of the sloped face 17 are properly set such that temporary locking canceling that will be described later is possible.

On the other hand, to a lower portion of the first lug chip 13, an engaged portion 18 with which the locking pawl 16 engages for temporary locking is provided. In the case of the present embodiment, the engaged portion 18 is formed of a pawl chip formed by cutting and raising a lower edge portion of the first lug chip 13 on a lug chip 13 side and in a diameter-reducing direction (direction C in FIG. 1) in which a diameter of the hose clip 10 is reduced.

At a lower edge portion (see FIG. 4A) on a back face side of the engaged portion 18, i.e., of a face on a side opposite to the face with which the locking pawl 16 of the engaged portion 18 engages, a rounded portion for facilitating sliding on the sloped face 17 is formed to constitute a sliding portion 19.

Moreover, at an intermediate portion of the leaf spring main body 11, a plurality of lightening holes 20 are formed for reducing weight and for increasing surface pressure on the hose H to facilitate engagement of the hose clip in the hose H.

Next, an operation of the hose clip 10 of the present embodiment will be described by reference to FIGS. 5A to 7B.

Figure 5A:
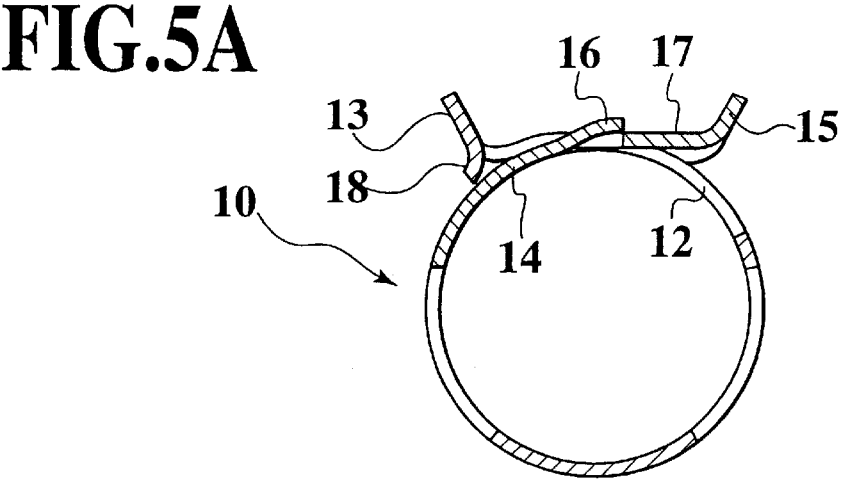
FIGS. 5A to 5D are explanatory views showing a temporarily locking step of the hose clip in order according to the first embodiment.

As shown in FIG. 5A, in a diameter-reduced state of the hose clip 10, the inserted chip 14 is inserted into the slot hole 12 and the lug chips 13 and 15 are opened to maximum with respect to each other.

Figure 5B:
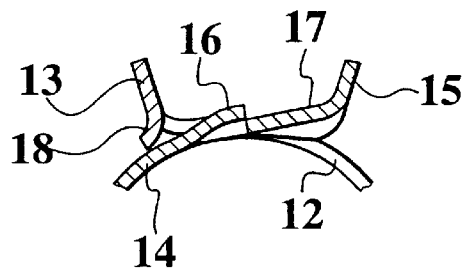
Figure 5C:
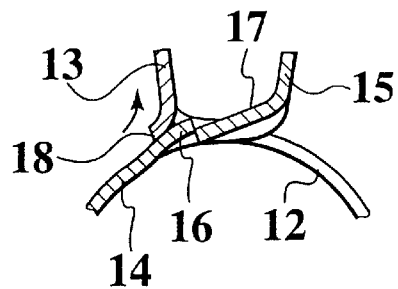

In this sate, as shown in FIGS. 5B to 5C, when the first lug chip 13 and the second lug chip 15 are pinched and closed by using the pair of pliers or the like, the engaged portion 18 formed at the lower portion of the first lug chip 13 climbs over the locking pawl 16 formed on the inserted chip 14 as shown by an arrow and moves toward the sloped face 17.

Figure 5D:
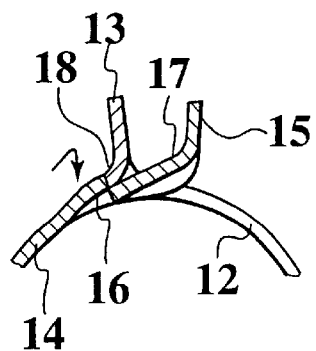

Then, in a state in which the engaged portion 18 has climbed over the locking pawl 16 and the sliding portion 19 is positioned close to a lower side of the sloped face 17, when grasping force of the pair or pliers or the like is weakened to open the first lug chip 13 and the second lug chip 15, the engaged portion 18 is engaged with the locking pawl 16 as shown by an arrow in FIG. 5D, thereby bringing the hose clip into the temporarily locked state in which the hose clip 10 is open.

While the hose clip 10 temporarily locked in the above manner is loosely fitted over the outer periphery of the hose H, an end portion of the hose H is fitted over a metal pipe or the like (not shown) and the hose clip 10 is positioned on an outer periphery of an end portion of the hose H to be connected.

Figure 6A:
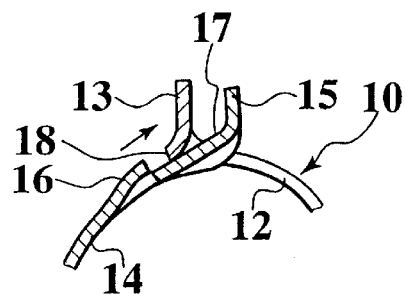
FIGS. 6A to 6G are explanatory views showing a temporary locking canceling step of the hose clip in order according to the first embodiment.
Figure 6B:
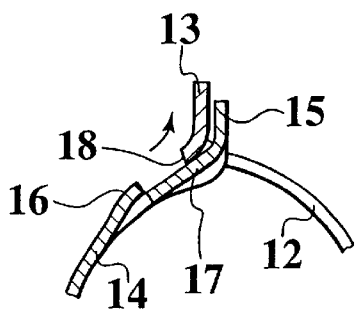

Next, as shown in FIGS. 6A and 6B, when the first lug chip 13 and the second lug chip 15 are pinched and closed firmly again by using the pair of pliers or the like, the rounded sliding portion 19 formed on the back face side of the engaged portion 18 climbs the sloped face 17 as shown by an arrow and the first lug chip 13 is deviated outward in the radial direction of the hose clip HC with respect to the inserted chip 14.

Figure 7A:
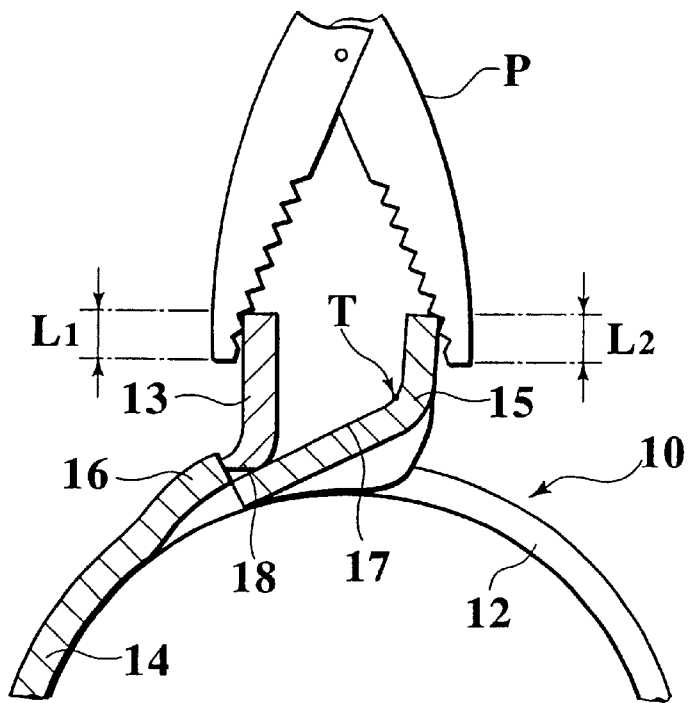
FIGS. 7A and 7B are explanatory views showing a principle on which the temporary locking is cancelled in the temporary locking canceling step according to the first embodiment.
Figure 7B:
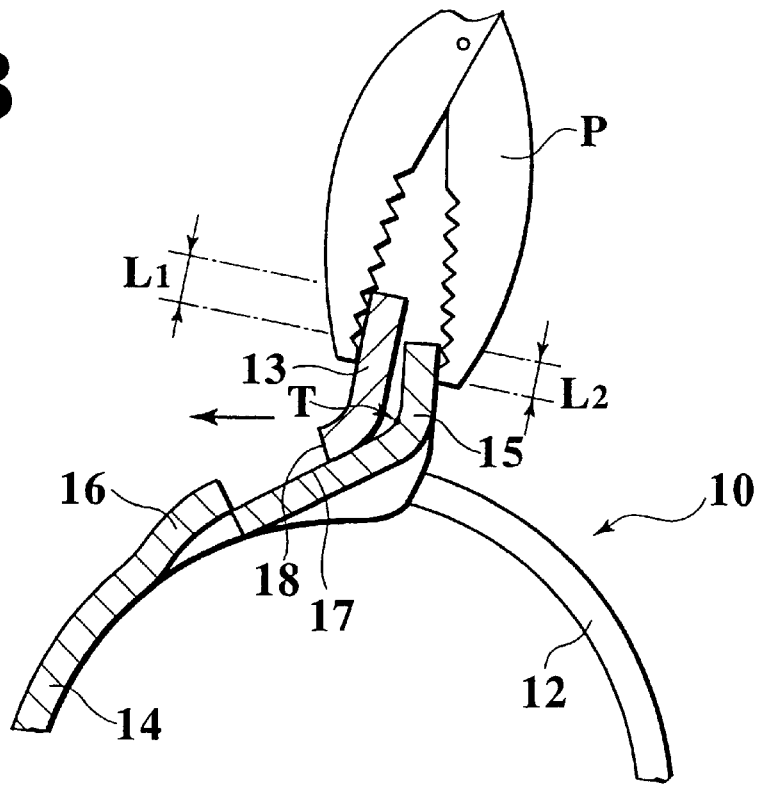

In other words, as shown in FIG. 7A, when both the lug chips 13 and 15 are closed by using a tool P such as the pair of pliers, the lug chips 13 and 15 are initially in contact with the tool P at such positions that $L_1$ is substantially equal to $L_2$. When the lug chips 13 and 15 has been completely closed, relationships between the lug chips 13 and 15 and the tool P change such that $L_1$ becomes larger than $L_2$ as shown in FIG. 7B because the lug chip 13 climbs the sloped face 17 and is deviated in the radial direction of the hose clip 10. Thus, an angle between the tool P and the hose clip 10 is closed and the tool P inclines from a position at the beginning of the step.

At this time, because the sloped face 17 has the bead shape and the sliding portion 19 on the back face side of the engaged portion 18 is rounded, the sliding portion 19 is liable to slide on the sloped face 17 and the above operation can be carried out smoothly. A chamfered portion 19' may be formed (see FIG. 4B) instead of forming the sliding portion 19 on the back face side of the engaged portion 18 into the rounded portion.

Figure 6C:
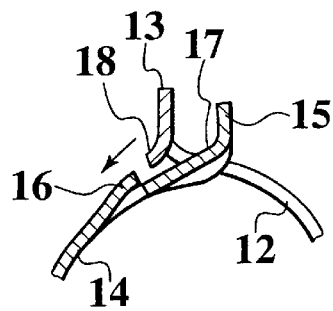
Figure 6D:
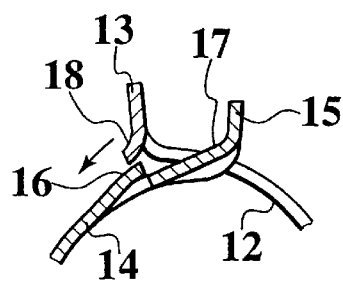

After the sliding portion 19 reaches the highest position T of the top portion of the sloped face 17, when the grasping force of the pair of pliers or the like is weakened to gradually open the first lug chip 13 and the second lug chip 15 as shown in FIGS. 6C and 6D, the engaged portion 18 is not engaged with the locking pawl 16 as shown by an arrow at this time and passes over the locking pawl 16 instead, thereby reducing the diameter of the hose clip 10. In other words, as shown in FIG. 7B, because the tool P is opened from a state in which the angle between the tool P and the hose clip 10 is closed and the tool P has inclined from a position at the beginning of the step, the engaged portion 18 is not engaged with the locking pawl 16 again as shown by the arrow, thereby achieving reduction of the diameter.

Figure 6E:
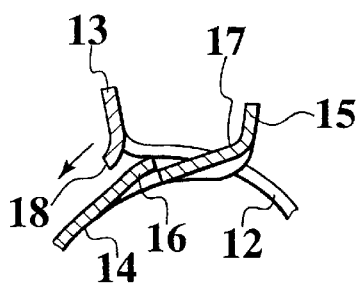
Figure 6F:
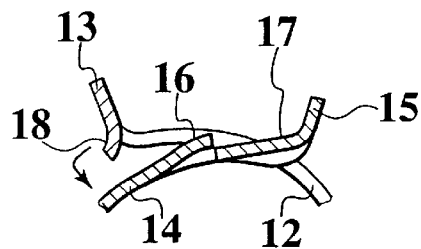
Figure 6G:
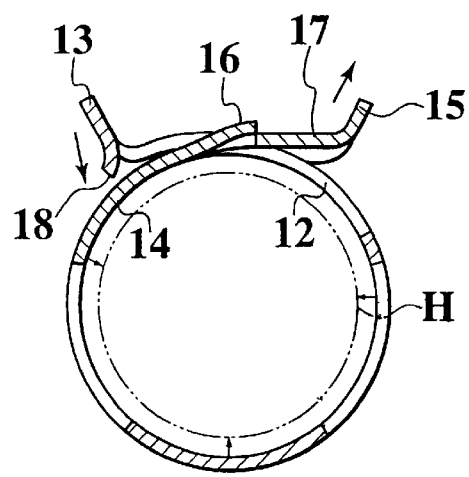

If the grasping force of the pair of pliers or the like applied to the first lug chips 13 and the second lug chips 15 is cancelled in this state, the lug chips 13 and 15 move as shown in FIGS. 6E to 6G and the diameter of the hose clip 10 is reduced by resilient force of the leaf spring main body 11 until the hose clip 10 is pressed against the hose H. Finally, an inner peripheral face of the leaf spring main body 10 is brought into a close contact with the hose H and in a substantially annular shape.

As described above, according to the hose clip of the present embodiment, when the first and second lug chips are pinched by using the pair of pliers or the like to open the leaf spring main body and the first and second lug chips are opened in a state in which the sliding portion is positioned close to the lower side of the sloped face, the engaged portion is engaged with the locking pawl, thereby reliably bringing the clip into the temporarily locked state.

In this state, the hose clip is disposed on the outer periphery of the hose to be connected. Then, when the first and second lug chips are pinched again and drawn toward each other by using the pair of pliers or the like, the sliding portion is guided by the sloped face and the first lug chip is pushed outward in the diameter direction of the hose clip. If the first and second lug chips are opened in this state, it is easy to allow the engaged portion to pass over the locking pawl without causing the engaged portion to be engaged with the locking pawl, and therefore, it is possible to reduce the diameter while retaining the hose clip. Therefore, a position and a state in which the hose clip is mounted can be easily controlled and the hose clip can be easily and accurately mounted.

Furthermore, according to the hose clip of the present embodiment, the sloped face extends to a position higher than the locking pawl. As a result, when the first and second lug chips are opened and are opened in a state in which the sliding portion has climbed the sloped face and reached the top of the sloped face, the engaged portion is not engaged with the locking pawl and is liable to pass over the locking pawl, thereby reliably carrying out canceling operation of the temporary locking state.

According to the hose clip of the present embodiment, the rounded portion or the chamfered portion for facilitating sliding on the sloped face is formed at the lower edge portion of the face of the engaged portion opposite to the face with which the locking pawl engages. As a result, the sliding portion is liable to slide along the sloped face when the first and second lug chips are pinched to cause the sliding portion to climb along the sloped face in canceling operation of the temporarily locked state of the hose clip, and therefore, the canceling operation can be carried out further easily.

According to the hose clip of the present embodiment, because a base portion of the second lug chip of the inserted chip is formed into the bead shape, reinforcing effect of the second lug chip can be obtained and also, a contact area between the sliding portion and the sloped face when the sliding portion slides on the sloped face is reduced to facilitate climbing the sloped face and to improve operability.

Next, a second embodiment of the invention will be described.

The present embodiment is different from the first embodiment in that a structure of the engaged portion with which the locking pawl 16 engages is changed and other structures of the present embodiment are similar to those in the first embodiment. Elements similar to those in the first embodiment are provided with similar reference numerals or characters to omit description of them.

Figure 8:
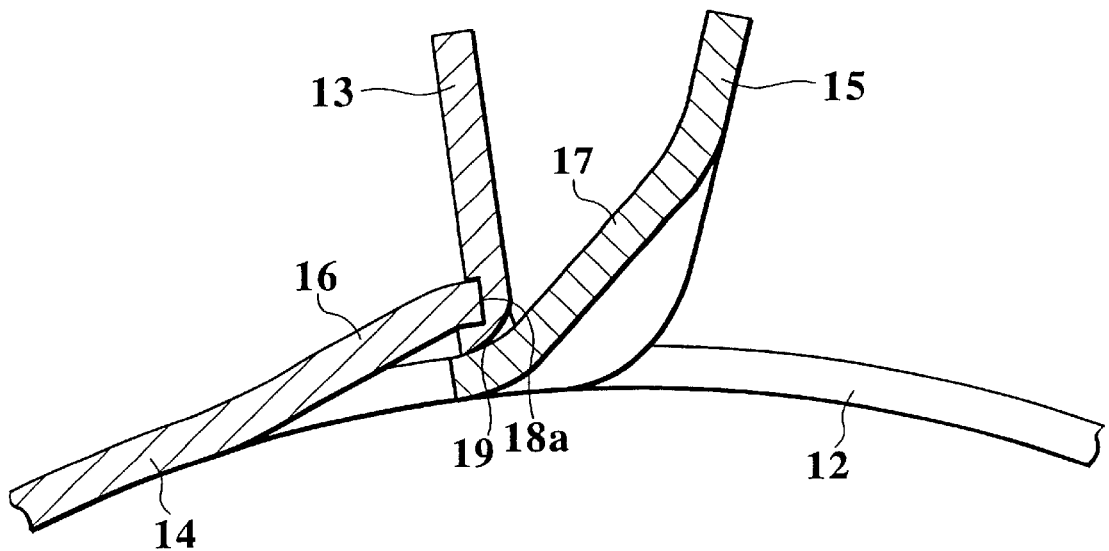
FIG. 8 is a partial enlarged sectional view showing a temporarily locked state of a hose clip according to a second embodiment of the invention.

Specifically, as shown in FIG. 8, the engaged portion 18a with which the locking pawl 16 engages is a recessed portion formed at the lower portion of the first lug chip 13. A shape of the recessed portion corresponds to a shape of a tip end portion of the locking pawl 16 and the locking pawl 16 is fitted into the engaged portion 18a and engaged reliably. The sliding portion 19 on the back face side of the engaged portion 18a has the rounded shape.

With the structure of the above present embodiment, when the first and second lug chips are pinched by using the pair of pliers or the like to open the hose clip and the first and second lug chips are opened in a state in which the sliding portion is properly positioned close to the lower side of the sloped face, the locking pawl is reliably engaged with the engaged portion that is the recessed portion to achieve the reliable temporarily locked state of the hose clip.

Next, a third embodiment of the invention will be described.

The present embodiment is also different from the first embodiment in that the structure of the engaged portion with which the locking pawl 16 engages is changed and other structures of the present embodiment are similar to those in the first embodiment. Elements similar to those in the first embodiment are provided with similar reference numerals or characters to omit description of them.

Figure 9:
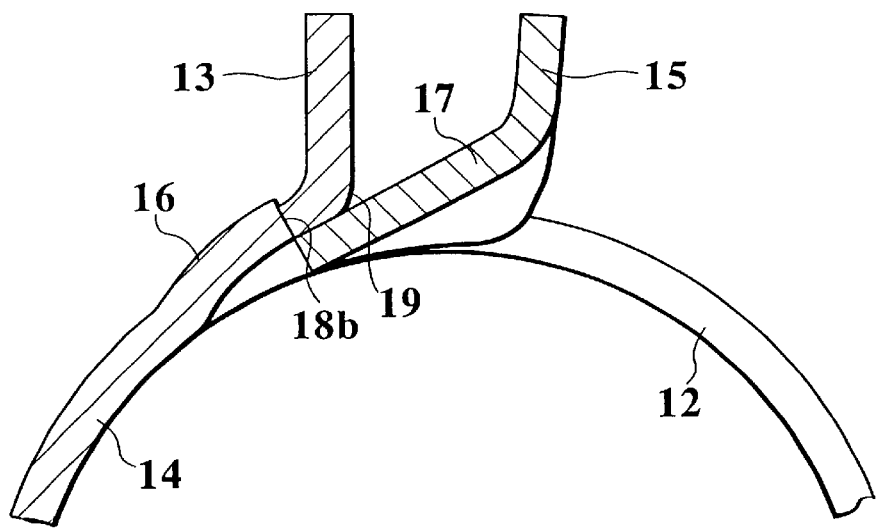
FIG. 9 is a partial enlarged sectional view showing a temporarily locked state of a hose clip according to a third embodiment of the invention.

Specifically, as shown in FIG. 9, the engaged portion 18b with which the locking pawl 16 engages is an abutted portion formed by bending a lower end portion of the first lug chip 13. A shape of the abutted portion corresponds to the shape of the tip end portion of the locking pawl 16 and the tip end portion of the locking pawl 16 is caused to abut the engaged portion 18b and is engaged reliably. The sliding portion 19 on the back face side of the engaged portion 18b has the rounded shape.

With the structure of the above present embodiment, when the first and second lug chips are pinched by using the pair of pliers or the like to open the hose clip and the first and second lug chips are opened in the state in which the sliding portion is properly positioned close to the lower side of the sloped face, the locking pawl is reliably engaged with the engaged portion that is the abutted portion to achieve the reliable temporarily locked state of the hose clip.

Next, a fourth embodiment of the invention will be described.

The present embodiment is different from the first embodiment in that the structure of the sloped face provided to the inserted chip 14 between the locking pawl 16 and the second lug chip 15 is changed and other structures of the present embodiment are similar to those in the first embodiment. Elements similar to those in the first embodiment are provided with similar reference numerals or characters to omit description of them.

Figure 10:
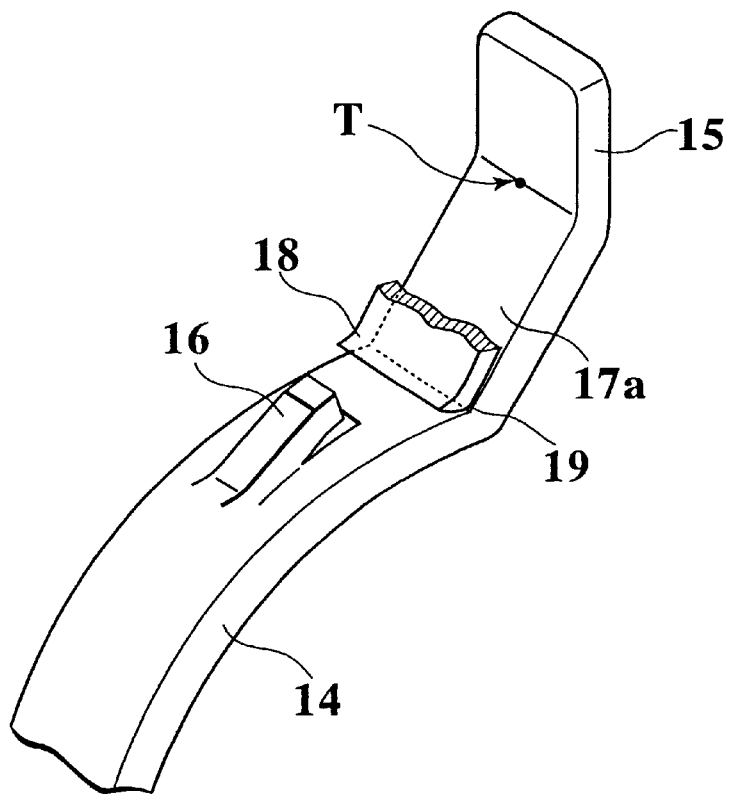
FIG. 10 is a partial enlarged perspective view mainly showing a sloped face of a hose clip according to a fourth embodiment of the invention.

Specifically, as shown in FIG. 10, the sloped face 17a is formed into a simple and flat sloped face without a bead shape between the locking pawl 16 and the second lug chip 15 of the inserted chip 14.

The sloped face 17a in the above shape is formed by bending the inserted chip 14 such that the sloped face 17a inclines outward in the diameter direction of the hose clip on the tip end side from the locking pawl 16. Of course, the sloped face 17a is similar to the sloped face in the first embodiment in that the sloped face has such a shape that the sliding portion 19 of the engaged portion 18 can reliably slide on the sloped face and that the sloped face has such height and position as to reliably cancel the temporarily locked state of the hose clip. Then, the inserted chip 14 is bent at the tip end side from the sloped face 17a to extend outward in the diameter direction of the hose clip to form the second lug chip 15.

With the structure of the above present embodiment, when the first and second lug chips in the temporarily locked state are pinched and closed by using the pair of pliers or the like, the sliding portion reliably climbs the flat sloped face to reach the highest position T. Then, when the grasping force of the pair of pliers or the like is weakened to open the first and second lug chips, the engaged portion is not engaged with the locking chip again and the diameter of the hose clip is reduced.

Next, a fifth embodiment of the invention will be described.

The present embodiment is different from the first embodiment in that the structure of the sloped face provided to the inserted chip 14 between the locking pawl 16 and the second lug chip 15 is changed and other structures of the present embodiment are similar to those in the first embodiment. Elements similar to those in the first embodiment are provided with similar reference numerals or characters to omit description of them.

Figure 11:
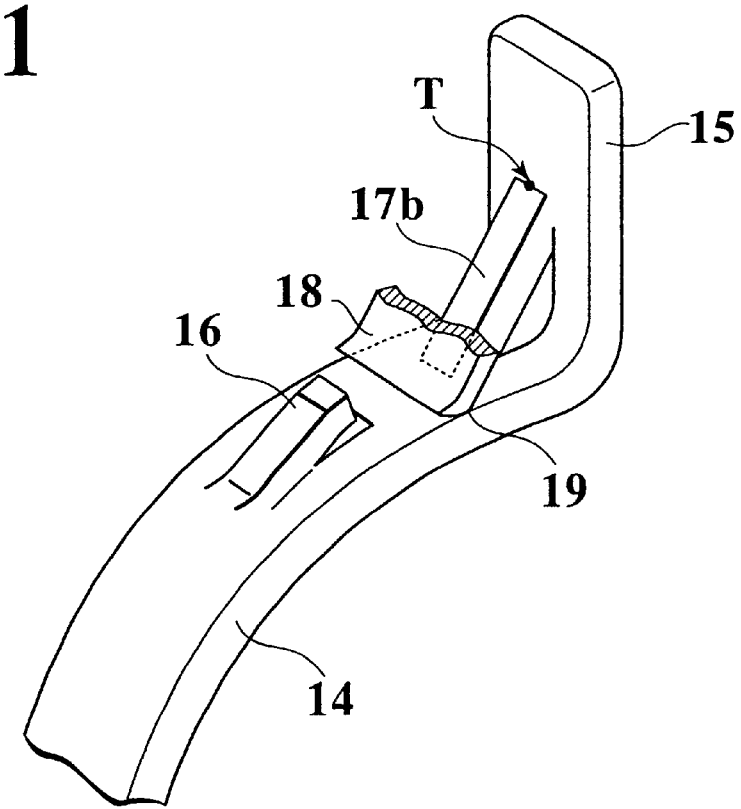
FIG. 11 is a partial enlarged perspective view mainly showing a sloped face of a hose clip according to a fifth embodiment of the invention.

Specifically, as shown in FIG. 11, the sloped face 17b is formed by using a face of a beam portion extending diagonally and partially at a center portion in a width direction of the inserted chip 14 between the locking pawl 16 and the second lug chip 15 of the inserted chip 14 as the sloped face.

The sloped face 17b in the above shape is formed by utilizing an outside face of the beam portion having rectangular open sectional faces, the beam portion being obtained by forming two parallel slits in a circumferential direction of the hose clip at an intermediate portion of the inserted chip 14 between a portion where the locking pawl 16 is formed and a portion where the second lug chip 15 is formed and then, by diagonally pushing a portion of the inserted chip 14 between the slits out in the diameter direction of the hose clip. Of course, the sloped face 17b is similar to the sloped face in the first embodiment in that the sloped face has such a shape that the sliding portion 19 of the engaged portion 18 can reliably slide on the sloped face and that the sloped face has such height and position as to reliably cancel the temporarily locked state of the hose clip. Then, the inserted chip 14 is bent in a position near the beam portion having the sloped face 17b to extend outward in the diameter direction of the hose clip to form the second lug chip 15.

With the structure of the above present embodiment, when the first and second lug chips in the temporarily locked state are pinched and closed by using the pair of pliers or the like, the sliding portion reliably climbs the partially provided sloped face to reach the highest position T. Then, when the grasping force of the pair of pliers or the like is weakened to open the first and second lug chips, the engaged portion is not engaged with the locking chip again and the diameter of the hose clip is reduced.

Next, a sixth embodiment of the invention will be described.

The present embodiment is different from the first embodiment in that the structure of the sloped faces provided to the inserted chip 14 between the locking pawl 16 and the second lug chip 15 is changed and other structures of the present embodiment are similar to those in the first embodiment. Elements similar to those in the first embodiment are provided with similar reference numerals or characters to omit description of them.

Figure 12:
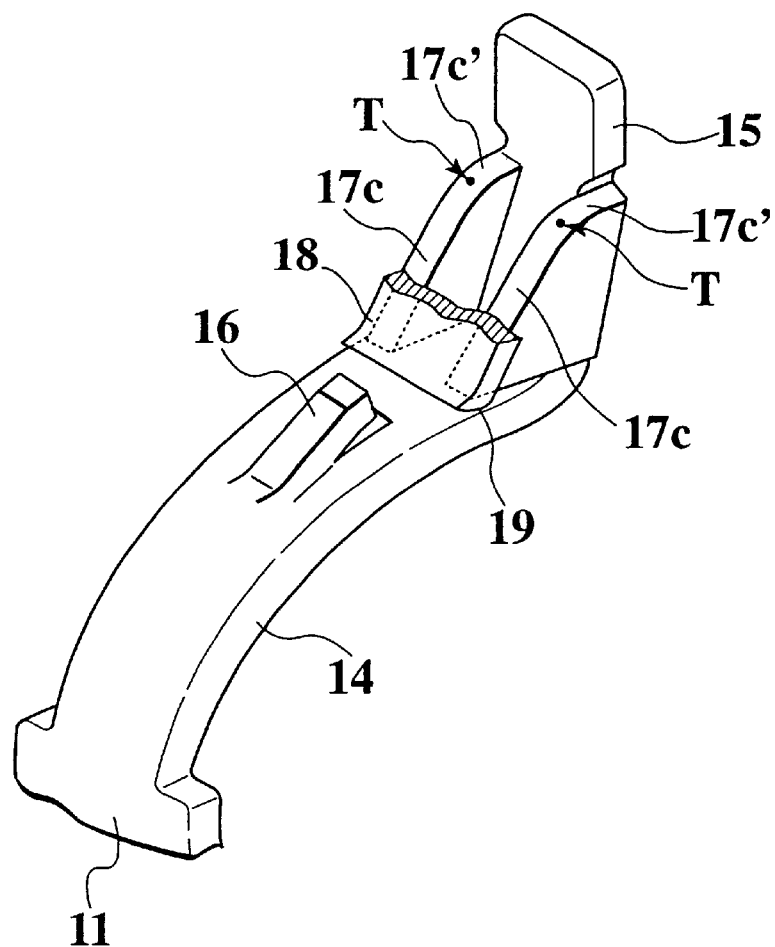
FIG. 12 is a partial enlarged perspective view mainly showing sloped faces of a hose clip according to a sixth embodiment of the invention.
Figure 13:
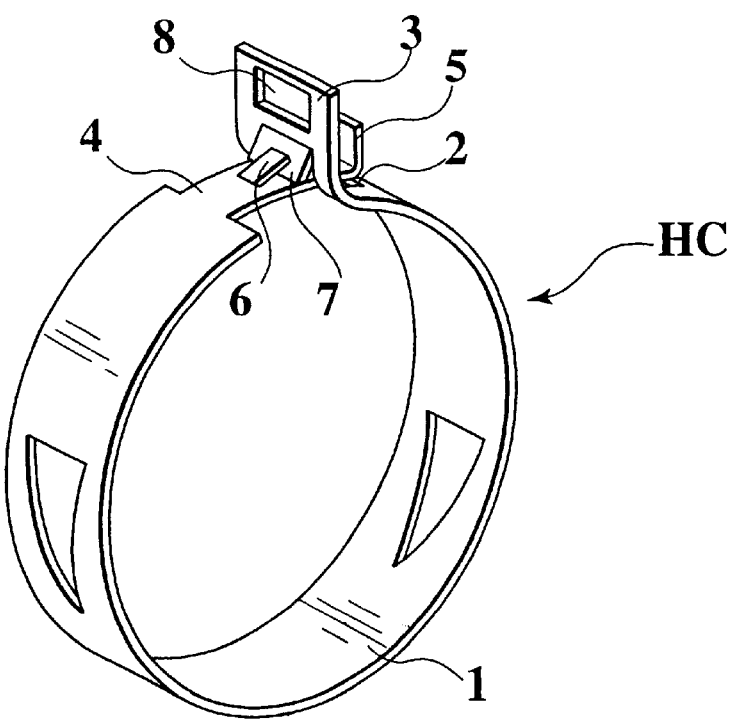
FIG. 13 is a perspective view showing a conventional hose clip.

Specifically, as shown in FIG. 12, the sloped faces 17c are formed as two sloped faces which are opposite end portions in the width direction of the inserted chip 14 respectively and partially extending diagonally between the locking pawl 16 and the second lug chip 15 of the inserted chip 14.

The sloped face 17c in the above shape is formed by utilizing faces of the portions obtained by respectively bending the opposite portions in the width direction of the inserted chip 14 outward at the intermediate portion between the portion where the locking pawl 16 is formed and the portion where the second lug chip 15 is formed on the inserted chip 14. Of course, the sloped faces 17c are similar to the sloped face in the first embodiment in that the sloped faces have such shapes that the sliding portion 19 of the engaged portion 18 can reliably slide on the sloped faces and that the sloped faces have such heights and positions as to reliably cancel the temporarily locked state of the hose clip. Then, the inserted chip 14 is bent in a position near the position having the sloped faces 17c to extend outward in the diameter direction of the hose clip to form the second lug chip 15.

Here, top portions 17c' extending from the respective sloped faces 17c are gently sloping to have reduced degrees of inclination and are formed as flat faces in parallel with a face of the inserted chip 14 immediately before the inserted chip 14 is bent to stand as the second lug chip 15, in the circumferential direction. Therefore, in canceling the temporary locking, the sliding portion 19 reliably climbs while sliding on the sloped faces 17c to reach the highest positions T and to move to the top portions 17c'. Then, because the sliding portion 19 is retained on the top portions 17c', spring force of the leaf spring main body 11 can be reduced effectively.

With the structure of the above present embodiment, when the first and second lug chips in the temporarily locked state are pinched and closed by using the pair of pliers or the like, the sliding portion reliably climbs the flat sloped faces to reach the highest positions T. Then, when the first and second lug chips are opened, the engaged portion is not engaged with the locking chip again and the diameter of the hose clip is reduced.

Furthermore, at this time, because the sliding portion 19 is retained on the top portions 17c' until the hose clip is positioned in a target position, the spring force of the leaf spring main body 11 can be effectively reduced to reduce the grasping force of the pair of pliers or the like. Therefore, when the first and second lug chips are opened after accurately positioning the hose clip in the target position, the engaged portion is not engaged with the locking chip again and the diameter of the hose clip is reduced in the accurate position.

Of course, it is possible to properly apply flat portions provided to the top portions of the sloped faces of the present embodiment to the bead-shaped sloped face in the first embodiment, the simple sloped face in the fourth embodiment, and the sloped face utilizing the beam-shaped portion in the fifth embodiment.

Of course, it is possible to properly combine the engaged portion using the recessed portion in the second embodiment or the engaged portion using the abutted portion in the embodiment 3 with the above various sloped faces.

Various modifications may be of course made without departing from the technical concept of the invention to carry out the present invention.

What is claimed is:

1. A hose clip comprising:
   a leaf spring main body formed by curving a resilient member into an annular shape;
   a slot hole provided to one end portion of the leaf spring main body;
   a first lug portion provided to the one end portion of the leaf spring main body on a tip end side from the slot hole and projecting outward as to the leaf spring main body;
   an inserted chip provided to the other end portion of the leaf spring main body to be inserted into the slot hole;

a projecting portion providing to the inserted chip and projecting outward as to the leaf spring main body;

an engaged portion provided to the one end portion of the leaf spring main body on a tip end side from the slot hole to be engaged with the projecting portion;

a second lug portion provided to the inserted chip on a tip end side from the projecting portion and projecting outward as to the leaf spring main body;

a sloped face provided between the projecting portion and the second lug portion on the inserted chip and projecting outward as to the leaf spring main body to be a larger degree as the sloped face approaches the second lug portion; and a sliding portion provided to the one end portion of the leaf spring main body on a tip end side from the slot hole to slide on the sloped face, wherein a temporarily locked state in which the projecting portion engages with the engaged portion is defined when a gap between the first lug chip and the second lug chip is reduced to open the leaf spring main body until the sliding portion climbs over the projecting portion, wherein the sliding portion slides over the sloped face such that the engaged portion moves outward along the sloped face when the gap between the first lug chip and the second lug chip is further reduced after the temporarily locked state, and wherein the engaged portion passes outside the projecting portion not to engage with the projecting portion when the gap between the first lug chip and the second lug chip is increased afterwards, thereby a diameter of the leaf spring main body being reduced.

2. A hose clip according to claim 1, wherein the projecting portion is a pawl-shaped member.

3. A hose clip according to claim 1, wherein the sliding portion is provided to a side opposite to the engaged portion at the one end portion of the leaf spring main body.

4. A hose clip according to claim 1, wherein a top portion of the sliding portion is positioned away from the leaf spring main body outward as compared with the projecting portion.

5. A hose clip according to claim 1, wherein the sliding portion has a rounded portion.

6. A hose clip according to claim 1, wherein the sliding portion has a chamfered portion.

7. A hose clip according to claim 1, wherein the engaged portion has a recessed portion corresponding to the projecting portion.

8. A hose clip according to claim 1, wherein the engaged portion has an abutted portion corresponding to the projecting portion.

9. A hose clip according to claim 1, wherein the sloped face is formed by use of a bead shape.

10. A hose clip according to claim 1, wherein the sloped face is formed by use of a flat face.

11. A hose clip according to claim 1, wherein the sloped face is formed by use of a beam portion.

12. A hose clip according to claim 1, wherein the sloped face has a flat portion on a top portion thereof.

* * * * *